United States Patent [19]

Kronstein

[11] Patent Number: 5,049,592

[45] Date of Patent: Sep. 17, 1991

[54] METAL OXIDE MODIFICATION FOR USE IN PROTECTIVE COATINGS

[75] Inventor: Max Kronstein, New York, N.Y.

[73] Assignee: The United States of America as represented by the Secretary of the Navy, Washington, D.C.

[21] Appl. No.: 366,116

[22] Filed: Jun. 14, 1989

Related U.S. Application Data

[62] Division of Ser. No. 204,316, Jun. 9, 1988, abandoned.

[51] Int. Cl.$^5$ .................... C09D 5/14; C09D 5/16; C08K 3/20; C08K 3/24
[52] U.S. Cl. .................... 523/122; 523/202; 523/210; 106/480; 524/413; 524/430; 524/431; 524/432; 524/433
[58] Field of Search ............ 523/122, 210, 202; 524/413, 430, 431, 432, 433; 106/480

[56] References Cited

U.S. PATENT DOCUMENTS

| | | | |
|---|---|---|---|
| 3,285,788 | 11/1966 | Svadlenak | 148/6.2 |
| 3,348,959 | 10/1967 | Csonka et al. | 106/480 |
| 4,143,015 | 3/1979 | Soeterik | 524/413 |
| 4,226,624 | 10/1980 | Ohr | 106/14.05 |
| 4,235,768 | 11/1980 | Ritter et al. | 106/300 |
| 4,282,126 | 8/1981 | Rodgers et al. | 260/27 |
| 4,305,853 | 12/1981 | Kronstein et al. | 106/480 |
| 4,337,092 | 8/1982 | Hestermann et al. | 106/14.05 |
| 4,389,460 | 8/1983 | Dawans et al. | 428/458 |
| 4,405,744 | 9/1983 | Greinecker et al. | 524/423 |
| 4,410,363 | 10/1983 | Supcoe et al. | 106/18.29 |
| 4,480,056 | 10/1984 | Parks | 523/122 |

Primary Examiner—Paul R. Michl
Assistant Examiner—Christopher P. Rogers
Attorney, Agent, or Firm—Luther A. Marsh; Sol Sheinbein; Howard Kaiser

[57] ABSTRACT

A low leaching nonpolluting marine antifouling coating formulation and a process for preparing the same which comprises surface pretreatment of the metal oxide pigment particles with a water-dispersed organic polymeric resinous material, such as by intensively mixing or milling the metal oxide pigment and the resin, in order to recover a water-dispersable polymeric resin modified metal oxide pigment for subsequent incorporation into new water-based coating formulations.

20 Claims, No Drawings

METAL OXIDE MODIFICATION FOR USE IN PROTECTIVE COATINGS

The invention described herein may be manufactured and used by or for the Government of the United States of America for governmental purposes without the payment of any royalties thereon or therefor.

CROSS REFERENCE TO RELATED APPLICATIONS

This is a division of application Ser. No. 07/204,316 filed June 9, 1988 now abandoned.

BACKGROUND OF THE INVENTION

1. Field of Invention

This invention generally relates to coating materials and to a process for preparing antifouling coating compositions incorporating metal oxides, particularly cuprous oxide in water-based paints, which are suitable for use in protecting underwater surfaces from hard fouling and slime build up.

2. Description of the Prior Art

In the prior art metal oxides have been used as toxicant pigments dispersed in solvent-based film forming vehicles. The most widely used form of such prior art is the red vinyl cuprous oxide antifouling paint, known as paint Formula No. 121, which consists of as much as 70-72% by weight of cuprous oxide with 86% copper content. The black version of this paint, known as paint Formula No. 129, consists of 58% cuprous oxide with 13% black iron oxide representing 68.5% copper in the pigmentation. Plastic shipbottom paints may contain a combination of 40% cuprous oxide with 11% zinc oxide and 3.8% magnesium silicate extender. For underwater use on rubber surfaces, a polyisobutylene polymer and 52.8% by weight of cuprous oxide or mercury compounds including mercuric oxide as toxicants are employed in antifouling paint coatings. Other heavy metal toxicant agents, including tin, lead, and arsenic compounds, and other organic toxicants, including fungicides and biocides, are also employed in antifouling paints that use cuprous oxide as the primary toxicant.

All of the above formulations are organic solvent-based paints and therefore release, on application, undesirable solvent vapors into the atmosphere. They also release afterwards, on water immersion, retained organic solvent matter into the water of the environment. While the normal mechanism of toxicant release involves a gradual loss of the soluble vehicle components by lixiviation, subsequent loss of the cuprous oxide is experienced by chemical reaction with seawater forming copper complexes of varying solubilities, depending upon the local concentration of hydrogen ion. Furthermore, the cuprous oxide can react during initial dispersion with the film forming polymeric resinous components of the vehicle, in particular the abietic acid of the rosin, so as to form copper compounds, such as copper resinate, which are also soluble and which may result in considerable amounts of toxic underwater releases.

The process of this invention is different from the present emulsification treatment used to incorporate inorganic metal oxides in some water-based latex paint formulations. Metal oxides have been emulsified for dispersion in water-based paints by reacting them with lecithin, a naturally occuring compound that consists of a mixture of diglyceride esters of certain fatty acids linked to the choline ester of phosphoric acid. These emulsified metal oxides, however, do not effectively release the metal toxicant when incorporated in a water-based latex formulation. The fluid lecithins are soluble in organic solvents only, and do not represent the products of polymerization treatment. Thus, even when the so reacted metal oxides are recovered and are again dispersed in water-based paints, they do not release toxicant effects themselves and are useful in antifouling paints only when organometal toxicants have been added.

Water-based antifouling paint formulations based on latex resins have not been used commercially for fouling protection in marine immersion applications. The previous water-based antifoulant paint formulations utilize water-based polymer latexes or water-dispersed alkyd resins with inorganic pigments which are not, or only slightly, reactive with such water-dispersed binder vehicles. They therefore, did not interfere with the stability and application of the water-based paints but, on the other hand, they did not contribute to the antifouling protection. This aspect was left to be accomplished by the incorporated organometal toxicant. Heavy metal inorganic antifoulants such as cuprous oxide have not previously been used due to the reaction with the vehicle. The reaction product of the metal oxides with the latex resin forms clumpy or grainy reaction products which settle during storage and are difficult to redisperse thus deteriorating paint application and performance.

Although the organometal toxicants are compatible with latex based antifouling formulations, most coating systems of this type contain various water soluble pigments, fillers and binders so that the organometals diffuse into the immersion water at high initial rates which decrease logarithmically with time. Various polymeric binder compounds have been developed to control the release rates of these organometal toxicants as exemplified by, for example, U.S. Pat. Nos. 3,016,369; 3,382,264; 3,930,971; 3,979,354; 4,064,338; 4,075,319; 4,174,339; 4,389,460; and 4,480,056.

SUMMARY OF THE INVENTION

Under these circumstances, it is highly desirable to develop methods to use metal oxides in antifouling paints under conditions where the rate of the toxic metal release can be held at lower levels and where the continuing release of retained organic solvents can be avoided. This is achieved by the present invention by modification of the metal oxide in a manner which allows its use in water-based antifouling paints.

Although metal oxides are widely used as toxic pigments in solvent-based antifouling paints, the present invention establishes that it is possible to make metal oxides applicable to such use in water-based antifouling paints without the need to also include additional organometal toxicants. The present invention is a method for modifying the surface of the metal oxide pigment particles with a water-dispersed polymeric resinous material, the product of which can be subsequently used in water-based paint formulations for the protection of surfaces exposed to a marine environment. By prior surface treatment of the metal oxide pigment particle with a water-dispersed polymeric resin, a modified metal pigment may be recovered and incorporated into new water-based antifoulant coating formulations.

The process of the present invention is a method for pretreating the surface of metal oxide pigment particles with water-dispersed polymeric resinous materials by intensively milling or mixing the constituents, then separating by filtration the reaction products, whereby water-dispersable polymeric resin modified metal oxide pigment particles and a metal oxide modified resin filtrate are obtained. The water-dispersable polymeric resin modified metal oxide particles represent a water-dispersable toxicant pigment for use in water-based antifouling paint formulations. When subsequently incorporated in antifouling paint formulations, the water-dispersable polymeric resin modified metal oxide pigment provides a continuous release of metal toxicant from the surface of the paint, thus providing continuing protection against undesirable growth of plant and animal life.

The present invention provides a process for formulating a low leaching marine antifouling coating composition of sufficient toxicity for preventing the growth of fouling organisms on marine structures, which comprises intensively mixing at least one metal oxide pigment solid with a water based latex material in the presence of water, separating the reaction products obtained from said mixing step consisting of latex modified metal oxide powder and metal oxide modified latex filtrate, in some cases adding an additional unmodified metal oxide pigment to the latex modified metal oxide powder, and dispersing the latex modified metal oxide powder in at least one water dispersed resinous binder vehicle in the presence of a solvent or in the presence of a solvent and antifoaming agent recovering a complex marine antifouling coating composition of sufficient toxicity to prevent the growth of fouling organisms on marine structures.

The process of the present invention transforms the metal oxide into complex matter between inorganic metal oxide and organic water-dispersable polymeric resinous material which renders the so modified metal oxide capable of being incorporated, alone or with other pigments, into new water-based antifouling coating compositions. The present invention modifies the metal oxides, in particular cuprous oxide with polymeric resinous materials, so as to yield the polymeric results of an emulsion polymerization of synthetic elastomeric materials. They therefore represent polymeric water-dispersables which are free of any glycerin esters or their solvent dispersions which have been used in the past lecithin treatment of metal oxides.

The rate of release of the metal toxicant from the new antifoulant paint formulations is reduced and the emission levels are lower when compared to conventional cuprous oxide paints. The present invention also makes it possible to prepare antifouling compositions with water as the main, or only if so desired, solvent while concurrently increasing the resistance of the applied compositions against the softening effect of engine oil, lubricating oils, and other non-drying oils.

Accordingly, an object of this invention is to establish a process and application for use of metal oxides as toxicant pigments in coating compositions without resulting, on storage, in development of solid coagulations and hard sedimentations which would be difficult to redisperse or apply smoothly in a desirable coating form.

Another object of the present invention is to limit the rate of toxic metal oxide released from the applied coating. The purpose of these compositions, on immersion in water, is to limit the release of toxic matter into the water and into the marine environment from sources such as operating ships and maritime installations which are coated with such compositions.

A further object of the present invention is to provide a water-based antifoulant paint which is effective in protecting submerged surfaces against the growth of marine organisms without having to incorporate therein an organometal toxicant.

Yet another object of the present invention is to increase the oil resistance of the applied coatings due to the increased resistance of water-based polymeric coatings against the effects of surface contamination by non-drying oils, such as motor oils, or pastes containing such non-drying oils.

Other objects and many of the attendant advantages of the present invention will be appreciated as the same become better understood by reference to the following examples and claims.

DETAILED DESCRIPTION OF THE INVENTION

The following specific examples are intended to illustrate the invention but not to limit it in any way:

EXAMPLE 1

1 part or 50 grams by weight of cuprous oxide (Type AA Glidden Durkee, SCM Corp.) are mixed with 1 part or 50 grams by weight of water and 2 parts or 100 grams by weight of polyacrylic latex (Rhoplex AC-235 -46% solids, Rohm & Hass Corp.) and the composition is intensively mixed or milled at room temperature for several hours. The mixing operation may be accomplished by several techniques including either ball or sand mill grinding, although ball milling is the preferred method since it has proven effective in providing the desired surface modification and thus will hereinafter be referred to. The latex-modified cuprous oxide solid is then isolated on a filter, with the cuprous oxide-modified latex representing the filtrate. The latex-modified solid pigment on the filter is further rinsed with water to remove adherent latex matter.

The fact that a modification of the cuprous oxide solid takes place on ballmilling with such a latex is established by comparison. After drying, the surface-modified pigment as well as a unmodified pigment are dispersed in mineral oil and the infrared spectra of these dispersions taken. The infrared analysis with a P-E Fourier Transform Infrared Spectrophotometer exhibits relative changes occurring in the spectra due to the presence of this latex-modified metal oxide reaction product.

The filtrate represents a copper modified latex whereby the copper is bound to the latex group via an oxygen grouping resulting from the use of the cuprous oxide as a modifier of the latex. This combination of inorganic and organic groupings is different from the formation of the conventional organometal toxicants used in antifouling paints, where several organic radicals are bound directly to the metal.

To establish that the copper actually enters the latex, 1 part or 50 grams by weight of cuprous oxide is ball-milled with 1 part or 50 grams by weight of water and 2 parts or 100 grams by weight of acrylic latex for 16 hours. The modified pigment is filtered off the filtrate. This filtrate then contains, according to Atomic Absorption Analysis, 16.500 micrograms of copper. This copper is present in the form of a complex over an oxygen grouping to the acrylic latex group. Therefore, this metal oxide-modified latex filtrate, is itself considered to have antifoulant properties.

The invention modifies the metal oxides, in particular cuprous oxide with a water dispersion of synthetic rubber latexes which represent the polymeric results of an emulsion polymerization of synthetic elastomeric materials. They therefore represent polymeric water-dispersions which are new and useful reaction products. The surface-modified cuprous oxide solid, in particular releases, when subsequently dispersed in water-based paints, a new complex release which has toxic effects itself and does not require the addition of an organometal toxicant, even though such material might be added when desired (see Example 6).

EXAMPLE 2

The preparation of the surface modifications is not limited to the acrylic latexes used in Example 1. Corresponding modifications are also made with the polyvinyl latexes as in this example, and other water-dispersed polymeric resinous materials such as other water-based polymer latexes and water-dispersed resinous materials such as water-dispersed alkyd resins where an interaction with cuprous oxide can take place. For instance, 2 parts or 150 grams by weight of cuprous oxide (Type AA Glidden Durkee, SCM Corp.) are mixed with 1 part or 75 grams by weight of water and 1 part or 75 grams by weight of polyvinyl acetate latex (Polyco 117 SS, Borden Corp.) and are ball milled at room temperature for several hours. The reaction between the cuprous oxide and the latex forms a gel state. Under the addition of more water to the mill product and through mixing of the components, the gel state is overcome. The surface-modified solid pigment is then separated by filtration.

The latex-modified cuprous oxide pigment has a tendency to agglomerate upon drying due to some residual adherent latex that is not involved in the formation of either the modified latex filtrate or the modified cuprous oxide. The remove the residual adherent latex from the latex-modified cuprous oxide pigment, the pigment is milled again with water, whereby the residual latex becomes a part of the mill water. Upon filtration, the residual latex remains in the filtrate and the modified pigment is collected and dried. The latex-modified cuprous oxide pigment particles can then be readily reduced to the desired size of a fine powder by renewed ballmilling.

To determine to what extent the copper grouping is present as a complex, 3 parts or 150 grams by weight of cuprous oxide are ballmilled with 2 parts or 100 grams by weight of water and 1 part or 50 grams of polyvinyl acetate latex; and, after filtering, the filtrate was analyzed using the Eberbach Electro-analyzer. The electric current of this instrument carries free metal ions to the platinum cathode, while the metal-organic complexed matter is carried to the anode. It is found that 57.4 percent of the composition is deposited at the cathode and 42.6 percent is deposited at the anode. The deposit at the anode indicates that this composition contains a representative complex between the metallic copper and the organic ligand.

EXAMPLE 3

The cuprous oxide is first surface-treated in accordance with Examples 1 or 2 and such already modified cuprous oxide pigment is then introduced into a film forming composition by techniques including the use of high speed dispersion and dispersing agents. Acceptable binder vehicles include water-dispersed polymeric resinous materials such as water-based latexes selected from the group consisting of polyvinyl acetate latex, acrylic latex, polyacrylic latex, urethane latex, and polyurethane latex; and water-dispersed resinous materials selected from the group consisting of alkyd resins, and others; and other water-based polymeric reactive materials. Therefore, paint compositions with latex binder vehicles can be further modified by also introducing a water-dispersed alkyd resin in water.

A formulation in accordance with this example is made as shown below:

| | |
|---|---|
| Cuprous oxide, pretreated as in Ex. 2 | 84.0 grams by weight |
| Polyvinyl acetate latex | 18.0 grams by weight |
| Water-dispersed alkyd resin | 36.0 grams by weight |
| (Aroplaz 585, Spencer Kellogg, Textron Inc.) | |
| Water | 20.0 grams by weight |
| Antifoaming agent (Nopco NXZ) | 4.5 grams by weight |
| A dispersing agent may be introduced also. | |

The surface-modified cuprous oxide according to the present invention can thus be used in any application, including organic solvent based paints, where the unmodified cuprous oxide had been used in antifouling paints and other coating applications. Moreover, the modified cuprous oxide can be introduced effectively into water based coating materials without interfering with the storage stability of such coating materials. The complex formation between the water-insoluble cuprous oxide and the water-based latex or other water based paint components, such as water-based alkyd resins, in applied coatings results in a gradual release of copper containing complexes into the immersion water. It therefore provides, on the surface to which it is applied, a progressing and continuous toxicant protection against marine growth.

EXAMPLE 4

Such antifoulant compositions can also be prepared using cuprous oxide in its initial form and producing the modification within the water based coating composition. Specifically, 1 part or 50 grams of cuprous oxide (Type AA Glidden Durkee, SCM Corp.) by weight is ball milled with 1 part or 50 grams by weight of water and 2 parts or 100 grams by weight of acrylic latex (Rhoplex AC-235–46% solids, Rohm & Hass Corp.) at room temperature for several hours. The ball milled product is then used as a surface coating without further treatment.

It is a result of the use of water-based polymeric vehicles in the preparation of the cuprous oxide/latex reaction products that the obtained applied coating is considerably more resistant to non-drying oils than the the conventional cuprous oxide paints. For instance, two coats of conventional solvent-based cuprous oxide antifouling paint are applied to steel panels, in some cases over an applied wash-primer, and the air dried panels were coated with an oil-paste consisting of 97 parts by weight non-drying oil such as paraffin oil-based motor oil (Gulflube XHD, Gulf Oil Corp.) and 10 parts by weight silica pigment (Aerosil 380 of Degussa, Inc.). The panels were exposed at 49° C. (120° F.) for one hour and were allowed to dry at room temperature. After removing the oil-paste layer, one panel was exposed in hot (80° C.(176° F.) water, whereafter the vinyl red solvent-based antifouling paint lifted off from the edges. The water-based paints with the modified cuprous oxide formulated in accordance with the present invention showed no softening effect from the same treatment.

EXAMPLE 5

Such film forming compositions can be prepared using cuprous oxide as the only toxic pigment or using cuprous oxide in combination with other metal oxide pigments. Other metal oxides suitable for use with the surface-modified cuprous oxide are selected from the group consisting of zinc oxide, lead oxide, tin oxide, iron oxide (black or red), magnesium oxide, cadmium oxide, arsenic oxide, and mercuric oxide, and other heavy metal oxides, in their initial form or in their so modified form. In such combined applications, the coated surface during immersion releases copper complexes in addition to complex releases from the other metal components.

A formulation in a water-based paint in accordance with this example is made as shown below:

| | |
|---|---|
| Cuprous oxide, pretreated as in Ex. 2 | 84.0 grams by weight |
| Zinc oxide, pretreated with polyvinyl acetate latex | 60.0 grams by weight |
| Polyurethane latex (Witcobond W234 of Whitco Chemical Company) | 88.0 grams by weight |
| Water | 20.0 grams by weight |
| Antifoaming agent (Nopco NXZ) | 4.50 grams by weight |
| A dispersing agent may be introduced also. | |

EXAMPLE 6

The paint compositions of Examples 3, 4, and 5 are further modified by introducing, in addition to the latex-modified metal oxide pigment, a small amount of organometal toxicant selected from the group consisting of triphenyltin acetate (TPTA), tributyltin oxide (TBTO is a registered trademark of M&T Chemicals, Inc.), tributyltin acetate (TBTA), tributyltin sulfide (TBTS), tributyltin fluoride (TBTF), triphenyltin fluoride (TPTF), triphenyltin hydroxide (TBTH), triphenyltin chloride (TPTC), triphenyllead acetate (TPLA), and phenyl mercuric acetate, and combinations of these such as TBTF/TPTF, and others. Such a paint composition is prepared in three steps, as follows:

| | |
|---|---|
| Step 1 | |
| Triphenyltin acetate (TPTA) | 2.25 grams by weight |
| Acetone | 1.00 grams by weight |
| Water | 5.00 grams by weight |
| Water-dispersed alkyd resin (Aroplaz 585, Spencer Kellogg, Textron Inc.) | 54.50 grams by weight |
| Step 2 | |
| Cuprous oxide, pretreated as in Ex. 2 | 84.0 grams by weight |
| Zinc oxide, pretreated with polyvinyl acetate latex | 60.0 grams by weight |
| Polyurethane latex (Witcobond W234 of Whitco Chemical Company) | 88.0 grams by weight |
| Water | 70.0 grams by weight |
| Antifoaming agent (Nopco NXZ) | 4.5 grams by weight |
| A dispersing agent may be introduced also. | |
| Step 3 | |
| The material of Step 1 is then ball milled with that of Step 2 for at least one hour. | |

EXAMPLE 7

When paint containing an already latex-pretreated metal oxide pigment is used with additional cuprous oxide within the same water-based coat forming vehicle, cuprous oxide in its initial form can be introduced as the additional pigment and will then participate in the coating formation and in the resulting toxicant release from the applied coating. This is established by preparing, applying and immersing a paint which has the same composition as the antifoulant paint of Example 5, but using the cuprous oxide in a not-modified form jointly with the latex-modified zinc oxide. In the same manner, the paint formulation of Example 6 can be prepared using the latex-modified zinc oxide jointly with unmodified cuprous oxide.

In order to produce antifouling effects on the coated surfaces it is necessary that the coated surfaces release, under water immersion, the copper containing copper complex. This is verified by immersing 3"×6" steel panels coated with one of the paint compositions of Example 6 or this Example in distilled water for 20 days at room temperature. The immersion water containing the released complex matter is then used to immerse either automotive steel (R-36, Q-Panel) or a high grade galvanized steel alloy (such as GALFAN of International Lead Zinc Research Organization, Inc.) whereby an immersion plating effect takes place in both cases. These deposits are identified as changes in the reflectance of the metal surfaces, after immersion into the release-containing waters, using a Photovolt Reflection Meter with blue, green, and amber tristimule filters.

The reflectance of the immersed metals are as follows:

| | REFLECTANCE READING | | |
|---|---|---|---|
| | BLUE | GREEN | AMBER |
| Steel Surface: | | | |
| Before Immersion | 21 | 24 | 21 |
| After Immersion | 12 | 12 | 12.5 |
| Galvanized Steel: | | | |
| Before Immersion | 40 | 28 | 41 |
| After Immersion | 19.5 | 15 | 21 |

The quantitative extent to which the copper release compares with concurrent zinc releases from the paints using cuprous oxide jointly with latex-modified zinc oxide is also of importance. The paint of Example 5, using latex as the only film former and using both modified cuprous oxide and modified zinc oxide, releases 1.6 ppm copper and 29.8 ppm zinc after 163 days of immersion. The corresponding paint of this Example, containing the modified zinc oxide with not-modified cuprous oxide, releases 1.7 ppm copper and 28.8 ppm zinc after 163 days of immersion.

The paints with latex and alkyd resin in the binder vehicle show an even greater difference between the copper and the zinc releases. The paint of Example 6 with pretreated zinc oxide and pretreated cuprous oxide releases, after 234 days of immersion, 0.9 ppm copper and 37.1 ppm zinc. The corresponding paint of this Example, containing pretreated zinc oxide and unmodified cuprous oxide in the formulation, releases only 0.4 ppm copper and 47.4 ppm zinc after 234 days of immersion.

Based upon the above data, it is evident that the zinc oxide complex will migrate from a combined pigment composition at a much faster rate than the copper complex, thereby restricting the copper contamination of the environment. Since zinc oxide is itself an anti-mold acting pigment, the presence of such zinc containing released matter contributes, together with the released copper complexes, to the preservation of the immersed coatings in fouling waters while simultaneously reducing the toxic copper-carrying emission level.

EXAMPLE 8

The fact that this release of copper carrying complex is actually considerably lower and, for environmental protection, more desirable than is the case with the prior cuprous oxide paints is demonstrated by comparing the amount of copper released into immersion waters from the prior solvent-based paints with the new water-based coatings of the present invention.

A conventional vinyl cuprous oxide antifouling paint (such as Formula No. 7628 of Hempel Company) is applied to 3"×6" steel panels and after 70 days of immersion in 500 ml of water at room temperature has an accumulated concentration of copper in the amounts of 6.5 and 7.0 ppm, according to analytical measurements with the Perkin-Elmer Atomic Absorption Spectrophotometer Model 3030. This corresponds to a normalized copper emission level equal to 0.0054 ppm/sq.in./day. The new latex modified paint of Example 5 has an accumulated concentration of 1.6 ppm copper after 163 days of immersion in 500 ml of water, according to four separate analytical measurement tests with the Perkin-Elmer Atomic Absorption Spectrophotometer Model 3030. This corresponds to a normalized copper emission level equal to 0.0005 ppm/sq.in./day. When the binder vehicle which is used produces a denser film by combining the latex with a water-dispersed alkyd resin within the new paint, as in accordance with the formulation of Example 6, the accumulated concentration after 234 days of immersion in 500 ml of water is only 0.9 ppm copper which corresponds to a normalized copper emission equal to 0.0002 ppm/sq.in./day.

Any of the new antifoulant paint compositions of the preceding examples may be applied to selected surfaces, such as fiber-glass board, metal surfaces, and others, directly or after applying primer coatings to such surfaces. Compatible primers in accordance with the present invention are the wash primers or a combination of such wash primers followed by shipboard vinyl red lead primer, and others. Furthermore, the new antifouling paint formulations may receive finish coats with paints such as the vinyl alkyd enamels which have been found suitable as a so-called top coat. In all of these applications the immersed coated surface will release copper-containing water soluble material, which can be identified by various techniques such as were used to analyze the releases from the prior solvent-based cuprous oxide antifouling paints.

Numerous modifications and variations of the present invention are possible in light of the above teachings. It is therefore to be understood, that within the scope of the appended claims, the invention may be practiced otherwise than as specifically described herein.

What is claimed is:

1. A process for formulating a low leaching marine antifouling coating composition for preventing the growth of fouling organisms on marine structures, which comprises:
    intensively mixing a metal oxide pigment solid with a water based latex material in the presence of water,
    separating the reaction products obtained from said mixing step consisting of latex modified metal oxide powder and metal oxide modified latex filtrate, and
    dispersing the latex modified metal oxide powder in a water dispersed resinous binder vehicle in the presence of a solvent.

2. A process for formulating a low leaching marine antifouling coating composition for preventing the growth of fouling organisms on marine structures, which comprises:
    intensively mixing a metal oxide pigment solid with a water based latex material in the presence of water,
    separating the reaction products obtained from said mixing step consisting of latex modified metal oxide powder and metal oxide modified latex filtrate, and
    dispersing the latex modified metal oxide powder in at least one water dispersed resinous binder vehicle in the presence of a solvent and antifoaming agent.

3. A process for formulating a low leaching marine antifouling coating composition for preventing the growth of fouling organisms on marine structures, which comprises:
    intensively mixing at least two metal oxide pigment solids with a water based latex material in the presence of water,
    separating the reaction products obtained from said mixing step consisting of latex modified oxide powders and metal oxide modified latex filtrate, and
    dispersing the latex modified metal oxide powders in at least one water dispersed resinous binder vehicle in the presence of a solvent and antifoaming agent.

4. A process for formulating a low leaching marine antifouling coating composition for preventing the growth of fouling organisms on marine structures, which comprises:
    intensively mixing a metal oxide pigment solid with a water based latex material in the presence of water,
    separating the reaction products obtained from said mixing step consisting of latex modified metal oxide powder and metal oxide modified latex filtrate,
    adding an additional unmodified metal oxide pigment to the latex modified metal oxide powder, and
    dispersing the modified and unmodified metal oxide pigments in at least one water dispersed resinous binder vehicle in the presence of a solvent and antifoaming agent.

5. A process for formulating a low leaching marine antifouling coating composition as recited in claims 1, 2, 3 or 4 wherein said dispersing step is accomplished by the use of high speed dispersion techniques.

6. A process for formulating a low leaching marine antifouling coating composition as recited in claims 1, 2, 3 or 4 wherein said dispersing step is accomplished by the use of dispersal agents.

7. A process for formulating a low leaching marine antifouling coating composition as recited in claims 1, 2, 3 or 4 wherein said water based latex is selected from the group consisting of acrylic latex, polyacrylic latex, vinyl acetate latex, polyvinyl acetate latex, urethane latex and polyurethane latex.

8. A process for formulating a low leaching marine antifouling coating composition as in claims 1, 2, 3 or 4 wherein each said metal oxide is a metal oxide selected from the group consisting of cuprous oxide, zinc oxide, lead oxide, tin oxide, red iron oxide, black iron oxide, cadmium oxide, magnesium oxide, arsenic oxide, and mercuric oxide.

9. A process for formulating a low leaching marine antifouling coating composition as recited in claim 3 wherein said two latex modified metal oxide pigment solids are cuprous oxide and zinc oxide.

10. A process for formulating a low leaching marine antifouling coating composition as in claim 4 wherein said modified metal oxide pigment is cuprous oxide and wherein said unmodified metal oxide pigment is a metal oxide selected from the group consisting of cuprous oxide, zinc oxide, lead oxide, tin oxide, red iron oxide, black iron oxide, cadmium oxide, magnesium oxide, arsenic oxide and mercuric oxide.

11. A process for formulating a low leaching marine antifouling coating composition as in claim 4 wherein said modified metal oxide pigment is selected from the group consisting of zinc oxide, lead oxide, tin oxide, red iron oxide, black iron oxide, cadmium oxide, magnesium oxide, arsenic oxide and mercuric oxide and wherein said unmodified metal oxide pigment is cuprous oxide.

12. A process for formulating a low leaching marine antifouling coating composition as recited in claim 1, claim 2 or claim 4 wherein said mixing step comprises intensively mixing cuprous oxide with polyvinyl acetate latex in the presence of water in a ratio of 2:1:1.

13. A process for formulating a low leaching marine antifouling coating composition as recited in claim 1, claim 2 or claim 4 wherein said mixing step comprises intensively mixing cuprous oxide with polyvinyl acetate latex in the presence of water in a ratio of 3:1:2.

14. A process for formulating a low leaching marine antifouling coating composition as recited in claim 1, claim 2 or claim 4 wherein said mixing step comprises intensively mixing cuprous oxide with acrylic latex in the presence of water in a ratio of 1:2:1.

15. A process for formulating a low leaching marine antifouling coating composition as recited in claim 1, claim 2 or claim 4 wherein said mixing step comprises intensively mixing cuprous oxide with polyacrylic latex in the presence of water in a ratio of 1:2:1.

16. A process for formulating a low leaching marine antifouling coating composition as recited in claims 1, 2, 3, or 4 wherein each said water dispersed resinous binder vehicle is selected from the group consisting of water based latexes and water dispersed alkyd resins.

17. A process for formulating a low leaching marine antifouling coating composition as recited in claim 16 wherein said water based latex is selected from the group consisting of acrylic latex, polyacrylic latex, vinyl acetate latex, polyvinyl acetate latex, urethane latex and polyurethane latex.

18. A process for formulating a low leaching marine antifouling coating composition as recited in claims 1, 2, 3, or 4 wherein each said solvent is selected from the group consisting of water and an organic solvent.

19. A process for formulating a low leaching marine antifouling coating composition as recited in claims 1, 2, 3, or 4 wherein said solvent is water.

20. A process for formulating a low leaching marine antifouling coating composition as recited in claims 1, 2, 3, or 4 wherein the step of intensively mixing comprises ball milling.

* * * * *